United States Patent
Kobayashi

Patent Number: 5,921,771
Date of Patent: Jul. 13, 1999

[54] REGENERATIVE OXYGEN PREHEAT PROCESS FOR OXY-FUEL FIRED FURNACES

[75] Inventor: Hisashi Kobayashi, Putnam Valley, N.Y.

[73] Assignee: Praxair Technology, Inc., Danbury, Conn.

[21] Appl. No.: 09/003,358

[22] Filed: Jan. 6, 1998

[51] Int. Cl.$^6$ ........................................ F27D 17/00
[52] U.S. Cl. ........................... 432/181; 432/179; 432/180
[58] Field of Search ................................ 432/179, 180, 432/181, 182

[56] References Cited

U.S. PATENT DOCUMENTS

| | | | |
|---|---|---|---|
| 3,870,474 | 3/1975 | Houston | 432/180 |
| 4,874,311 | 10/1989 | Gitman | 432/181 |
| 4,909,727 | 3/1990 | Khinkis | 432/181 |
| 4,923,391 | 5/1990 | Gitman | 432/181 |
| 5,057,010 | 10/1991 | Tsai | 432/179 |
| 5,279,235 | 1/1994 | Greco | 432/181 |
| 5,352,115 | 10/1994 | Klobucar | 432/181 |
| 5,443,040 | 8/1995 | Kaji et al. | 432/180 |
| 5,620,668 | 4/1997 | Driscoll et al. | 432/181 |

OTHER PUBLICATIONS

Regenerative Ceramic Burner Technology and Utilization, Martin, Industrial Heating, Nov., 1988, pp. 12–15.
"Synthetic Air" for Oxy–Fuel Glass Melting Furnaces with Filtration and Regeneration, Argent, Society of Glass Technology, Jan. 17, 1997.
Test Focuses on Improving Oxy–Fuel Glass Melter Efficiency, Browning et al., Glass Industry, Apr., 1997, pp. 32–38.

*Primary Examiner*—Teresa Walberg
*Assistant Examiner*—Jiping Lu
*Attorney, Agent, or Firm*—Stanley Ktorides

[57] ABSTRACT

A method and apparatus for supplying oxygen to an oxy-fuel fired furnace that has been preheated by heated flue gas recycled from the furnace. One or more regenerators are provided each having at least a first and a second regenerator bed. The beds are alternately cycled so that one is being preheated with hot flue gas exhausted from the furnace while the other is preheating oxygen through its already heated bed for supply to the furnace burner. The amount of hot flue gas supplied to the regenerator beds is controlled by continuously venting a portion of the total furnace flue gas so as to bypass the regenerators, and the regenerator beds are purged of residual oxygen by recycled cooled flue gas which is then supplied to the furnace before the regenerator beds are heated by the flue gas.

4 Claims, 3 Drawing Sheets

5,921,771

REGENERATIVE OXYGEN PREHEAT PROCESS FOR OXY-FUEL FIRED FURNACES

FIELD OF THE INVENTION

The present invention relates to a method and apparatus for the preheating of oxygen to be supplied to an oxy-fuel fired furnace.

BACKGROUND OF THE INVENTION

Furnaces are used in many processes, such as smelting of metals and processing of glass. In such furnaces a fuel is supplied and combusted to heat the material being processed and a hot waste flue gas is produced. Many present day furnaces use oxy-fuel firing, that is, the use of a fuel with oxygen, instead of the normal combustion air, to improve energy efficiency and productivity, and to reduce undesired nitrogen-oxide (NOx) emissions in the flue gas. A factor to be considered in such oxy-fuel fired furnaces is the efficiency of the combustion process, since oxygen is relatively costly as compared to combustion air.

A significant fraction of energy is lost in the flue gas of high temperature furnaces, even in those of the oxy-fuel fired type. In some air fired furnace systems, the flue gas is used in a regenerator to preheat the combustion air before it is applied to the furnace to increase combustion efficiency.

Oxygen at ambient temperature is generally used in an oxy-fuel fired furnace due to technical difficulties of handling high temperature oxygen for combustion. Oxygen can be preheated in a metallic recuperator to a preheat temperature of up to about 1300° F. Preheating to higher temperature causes problems and raises concerns for the material of the recuperator tubes. In addition, the economics of using recuperators is not very attractive since only a relatively small amount of the flue gas heat is recovered to preheat the oxygen.

A rapid cycle regenerator is available for air-fuel fired furnaces in which the heated flue gas is used to preheat the air. Since the typical cycle time of a rapid cycle regenerator is less than 2 minutes, the size of the beds is small. However, engineering problems exist to preheating of oxygen using these regenerators. One such problem is that, following the teachings of preheating air, the entire flue gas output of the furnace is passed through the regenerator. When preheating oxygen, as compared to preheating air, the flue gas temperature after the regenerator remains excessively high compared to that of the air fired regenerator. Another problem is the residual oxygen remaining in the regenerator at the end of the oxygen preheating cycle. The volume of residual oxygen may correspond to about 5 to 10% of the oxygen flow volume per preheating cycle. Higher NOx emission as a result of higher oxidant preheat temperature is yet another problem.

BRIEF DESCRIPTION OF THE INVENTION

The present invention provides a method and apparatus for preheating of oxygen to a high temperature without the previously described shortcomings. The invention has particular use in an oxy-fuel fired furnace.

In accordance with the invention, one or more regenerators are associated with the furnace. Each regenerator has first and second regenerator beds. The two beds of a regenerator are alternately controllably supplied with oxygen at ambient temperature and flue gas from the furnace. During one part of a cycle of operation, the first bed is heated by heated furnace flue gas exhausted from the furnace while oxygen at ambient temperature is supplied to the already heated second bed. This preheats the oxygen which is then supplied to the furnace. The ambient oxygen supplied to the second bed depletes its heat to a point at which it can no longer effectively preheat the oxygen to a high enough temperature. During the next part of the cycle, the operation of the two beds is switched.

In a preferred embodiment of the invention, before the switching takes place, the supply of oxygen to the second bed is terminated and the second bed is supplied with cooled flue gas to purge residual oxygen in the bed to the furnace. The second bed is then supplied with the hot furnace flue gas to preheat it and oxygen is supplied to the now preheated first bed to be preheated and supplied to the furnace.

Heating of a bed and preheating of the oxygen alternates between the two beds so that there is a continuous supply of preheated oxygen available for the furnace. The heating of the beds is carried out without using the complete volume of the flue gas available from the furnace. Also, the beds are purged of residual oxygen to prevent waste.

Regenerators can be used to preheat the oxygen supplied to the furnace to within 400° F. of the flue gas temperature. This reduces both fuel and oxygen consumption. For example, in a furnace fired with natural gas and oxygen, a heat recovery ratio of 0.42 can be achieved when oxygen is preheated to 2000° F. and the flue gas temperature is 2400° F. This preheating of the oxygen would provide about 8% fuel and oxygen savings over the baseline oxy-fuel firing without flue gas heat recovery. A saving of about 8%, is equivalent to saving twice that amount of fuel for an air fired combustion case, since the cost of oxygen is roughly the same as the cost of fuel.

OBJECTS OF THE INVENTION

It is therefore an object of the invention to provide a novel method and apparatus for regenerative preheating of oxygen using the flue gas of an oxy-fuel fired furnace.

Still another object is to provide a method and apparatus in which NOx emissions from combustion of fuel and preheated oxygen is reduced.

BRIEF DESCRIPTION OF THE DRAWINGS

Other objects and advantages of the present invention will become more apparent upon reference to the following specification and annexed drawings, in which:

FIG. 4 is a schematic diagram showing a PSA bed to be used as an oxygen source.

DETAILED DESCRIPTION OF THE INVENTION

Figure 1:
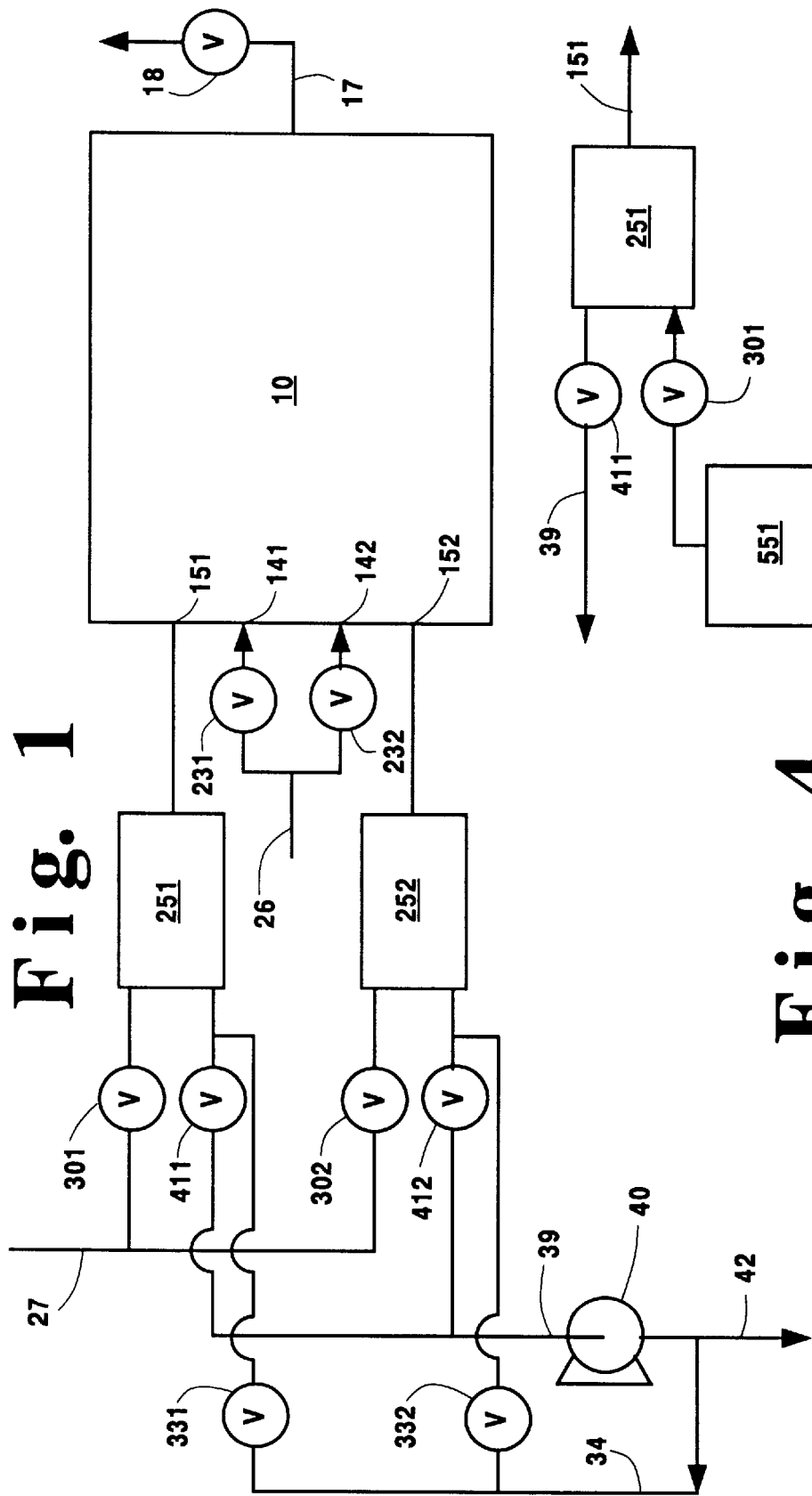
FIG. 1 is a schematic diagram of a system for implementing the invention.

FIG. 1 is a schematic diagram of a system for carrying out the process according to the invention. There is shown a furnace 10 of suitable size and type, for example, to be used to heat metal. Spaced around the furnace walls are a plurality of fuel injection ports 141 and 142. Fuel injectors 141 or 142 alternately receive fuel of any suitable type, for example, coal, natural gas, fuel oil, etc., from a fuel source over line 26, as controlled by respective supply valves 231 and 232. These valves, as are the other valves used in the system, are of any suitable type compatible with the temperature and materials encountered. The valves of the system are electrically, pneumatically, or fluid controlled and operated in a predetermined time sequence by a suitable conventional controller (not shown). The controller can receive temperature and gas flow information from suitable sensors for each of the monitored points of the system as required.

Also spaced around the furnace walls are a plurality of ports 151 and 152, which communicate respectively with a regenerator bed 251 and 252, described below. Heated oxygen is introduced into furnace 10 alternately through the furnace regenerator ports 151 and 152. In describing the preferred embodiment of the invention, "oxygen" is defined as oxidant having an oxygen concentration of at least 30 percent, preferably at least 80 percent, or technically pure oxygen having an oxygen concentration of at least 99.5 percent. A portion of the heated flue gas is also exhausted alternately through ports 151 and 152 to a respective regenerator bed to be used to preheat the oxygen supplied to the furnace. Only a pair of each of the fuel injection ports and regenerator ports are shown for purposes of illustration. The number of ports can be expanded as desired, as explained below.

Furnace 10 has a flue gas outlet port 17 for a continuous outflow of a portion of the heated furnace flue gas, for reasons described below. A flue gas damper 18 controls the amount of flue gas exiting the furnace through port 17.

Associated with the furnace 10 is one or more regenerators, for example similar in mechanical design to the air type rapid cycle regenerator described in an article entitled, "Regenerative Ceramic Burner Technology and Utilization", authored by T. Martin (Industrial Heating Magazine, November 1988, pp. 12–15). Each of the regenerators has a plurality of beds. A bed contains a material, such as ceramic balls, that can be heated by passing through hot flue gas and can heat cooled gas passing over the heat bed. In the illustrative embodiment of the invention described, one such regenerator is shown having two beds 251 and 252. The beds 251 and 252 are shown schematically spaced apart in the same furnace wall. The beds can be placed side by side or placed separately in different furnace walls.

Each of the regenerator beds 251, 252 receives oxygen at ambient temperature from a suitable source, not shown, over a supply line 27 through valve 301 or 302 respectively. Valves 301 and 302 selectively supply oxygen from line 27 to the respective regenerator bed 251 and 252. When oxygen is supplied to a bed 251 or 252, it flows through it wherein it is preheated, and thereafter enters the furnace through the respective port 151 or 152.

Each of the beds 251 and 252 has an outlet through a respective valve 411 and 412 to an outlet, or vent, line 39 in which there is a blower 40 that leads to a system outlet port 42. When a bed is to be heated, the heated furnace flue gas is exhausted through the bed by turning on blower 40 and opening the respective bed outlet valve 411 or 412. This exhausts heated flue gas from the furnace to flow through the bed.

Each regenerator bed 251 and 252 also can be supplied with cooled flue gas as a purge gas from the output of the blower 40 over line 34 through respective valves 331 and 332. The purge gas in line 34 is somewhat cooler than the gas in vent line 39, due to heat loss, and is at a somewhat higher pressure than the gas in line 39.

The operation of the system of FIG. 1 is as follows. Consider that the bed 252 is being heated, while the already heated bed 251 is preheating oxygen to be supplied to the furnace.

(1) Valve 231 is open to supply fuel from line 26 for injection into furnace 10 through fuel injector 141. Valve 232 is closed, so no fuel is being supplied to fuel injector 142. Valve 301 is open to supply oxygen from line 27 to flow through and be preheated by the heated regenerator bed 251. The heated oxygen is supplied to the furnace from bed 251 through furnace port 151. During this time, valve 302 is closed to block oxygen from entering regenerator bed 252. Blower 40 is turned on, valve 412 is opened and the hot flue gas is exhausted through bed 252, entering the bed through the port 152, and exiting through the open valve 412 to the outlet line 39. The bed of the regenerator 252 is heated and the flue gas is cooled during the exhaust of the hot flue gas therethrough. Valve 411 of the first regenerator bed 251 is closed so the blower does not affect it.

(2) When the second regenerator bed 252 is heated to the desired temperature, valve 301 is closed to stop the oxygen flow to the first bed 251. Measurement of the bed temperature can be accomplished directly or else the temperature of flue gas in the outlet line 39 can be measured. For example, a measured temperature of 100 to 500° F. can be used to trigger closing valve 301.

(3) The first regenerator bed 251 has lost its heat to the oxygen that passed through it to the furnace and is not receiving the cool oxygen from source 27. The valve 331 is opened for a short time to recycle part of the cooled flue gas in outlet line 39 back through the recycle line 34 to the regenerator bed 251 to purge it of any residual oxygen and the purged oxygen is supplied to the furnace through port 151.

(4) Valve 231 is closed to stop the fuel flow through fuel injector 141 and valve 412 is closed to stop exhausting of flue gas through regenerator bed 252. Valve 302 is now opened to supply the cool oxygen from source 27 to the second regenerator bed 252, which has been heated. Valve 411 is also opened so that the hot flue gas is being exhausted from the furnace through the regenerator bed 251 to heat it. The oxygen is preheated by regenerator bed 252 and is supplied to the furnace port 152. Since the residual flue gas in the regenerator bed 252 will come out first, immediately after the oxygen supply valve 302 is opened, valve 232 is opened to supply fuel to the furnace fuel injector 142 with a short delay to account for this bed purging period. No oxygen is being supplied to the first regenerator bed 251, since valve 301 is closed.

The above steps are repeated for the alternate cycling of each of the two beds between being heated by flue gas exhausted from the furnace and supplying preheated oxygen to the furnace. That is, there is an exhausting of hot flue gas through one of the two regenerator beds to heat it while oxygen at ambient temperature is being passed through the other bed, which has previously been preheated, to be preheated and supplied to the furnace. Due to the switching from one bed to the other, there is a constant supply of preheated oxygen to the furnace. When two regenerator ports are placed in close proximity one the same wall, one or more common fuel injectors can be used to serve both ports. Also, for each bed it is possible to have multiple ports and fuel injectors.

Conventional rapid cycle regenerators designed for air firing furnaces, for example those described by T. Martin in the previously referenced article, are not considered to be retrofitable for preheating oxygen from the standpoint of material compatibility. Other problems exist which are overcome by the subject invention as described below.

First, when the entire volume of flue gas from an oxy-fuel fired furnace is passed through a regenerator, the flue gas temperature after the regenerator remains quite high (about 1500° F. for a natural gas-oxygen fired furnace operating at about 2400° F.) compared to that of the air fired regenerator (typically about 300° F.). This is caused by the imbalance of flue gas volume versus the oxidant volume. For combustion of natural gas with air, one volume of natural gas is combusted with about ten volumes of air to produce eleven volumes of flue gas. Thus, the volume of flue gas and that of air are close. When technically pure oxygen is used for combustion, the ratio of flue gas volume to oxygen volume becomes about 3 to 2. In addition, the specific heat of flue gas is much higher than that of oxygen. High flue gas temperature after the regenerator bed increases the costs of pipes, valves and blowers to handle the flue gas. It is preferred to control the flue gas temperature after the regenerator at less than 900° F., more preferably less than 500° F.

Figure 2:
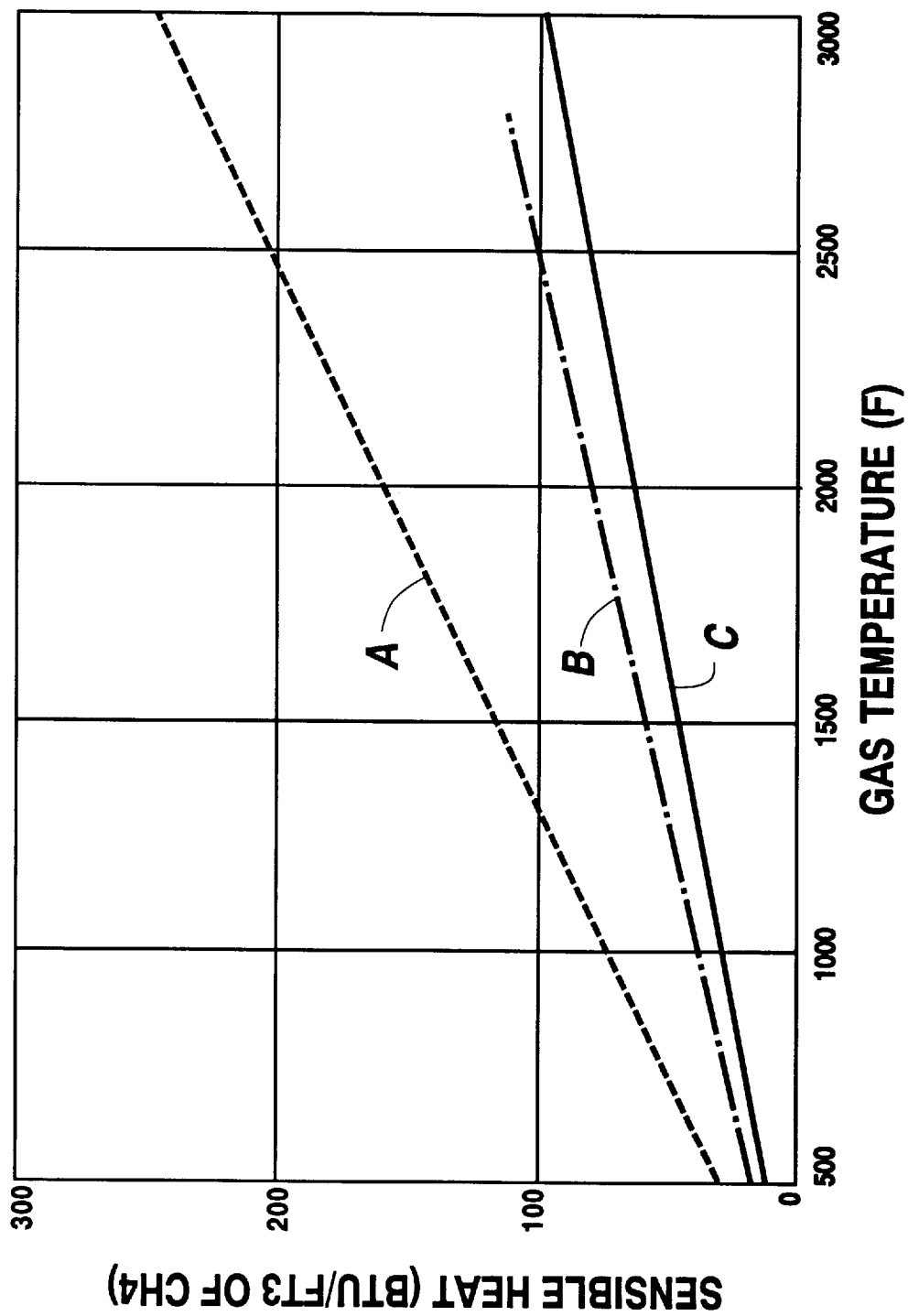
FIG. 2 is a graph showing the proper balance of sensible heat to flue gas and oxygen with a partial flue gas bypass.

In accordance with the invention, a solution to this problem is to bypass a portion of the flue gas, between 20 to 70%, and preferably between 30 to 60% of the total furnace flue gas volume, through a separate flue port, such as 17. FIG. 2 shows an example of properly balancing of sensible heat of flue gas and oxygen with a partial flue gas bypass. Line A shows the sensible heat of flue gas as a function of gas temperature without any flue gas bypass. Line C shows the sensible specific heat of the remaining 40% of flue gas as a function of gas temperature, with 60% of the total flue gas being bypassed from entering the regenerators. Line B, by comparison, shows the specific heat of a 100% oxygen gas stream as a function of gas temperature. If the flue gas temperature is 2400° F., the sensible heat contained in 100% and 40% of flue gas from stoichiometric combustion of $CH_4$ and technically pure oxygen is about 193 and 77 Btu per 1 SCF of $CH_4$, respectively. The sensible heat of oxygen is 77 Btu per 1 SCF of $CH_4$ at about 1900° F. Thus, in an ideal regenerator all of sensible heat contained in 40% of flue gas at 2400° F. is transferred to oxygen, the flue gas would cool down to the ambient temperature and oxygen would be preheated to 1900° F. If, on the other hand, 100% of flue gas is passed through an regenerator and oxygen is preheated to 1900° F., 116 Btu per 1 SCF of $CH_4$ of excess sensible heat would remain in the flue gas, resulting in an excessive flue gas temperature after the regenerator. The optimum amount of flue gas bypass depends in part on the pure oxygen concentration of the oxygen stream and the amount of ambient air infiltration into the furnace. When the oxygen concentration is greater than 80 percent and the amount of air infiltration is negligibly small, about 40 to 60% of the total furnace flue gas may be bypassed from the regenerator beds. When the oxygen concentration is relatively low and in a range of 30 to 50%, from 20 to 40% of the total flue gas may be bypassed. When the amount of the air infiltration is significant, the amount of flue gas bypass is increased to compensate for the increased flue gas volume.

In the present invention the bypass flue gas outlet port 17 permits selection of the amount of flue gas to be bypassed from the regenerator beds. Port 17 continuously vents a portion of the total volume of the furnace flue gas. This portion is controlled by the flue gas damper 18. Damper 18 is adjusted to control the amount of flue gas admitted to the regenerators as a percentage of the total furnace flue gas volume. This can be accomplished automatically to achieve a preset level.

A suitable collection, cleaning and/or recovery system (not shown) can be used to further process the vented gas from port 17 and from the vent line 39.

A second problem of the conventional rapid cycle regenerator is the residual oxygen in a regenerator bed prior to starting its heating. The volume of residual oxygen depends on the design of the regenerator and the cycle time and may correspond to as high as 5 to 10% of the oxygen flow volume per cycle for a rapid cycle regenerator with a cycle time of less than 1 minute. It is desirable to use this residual oxygen for useful combustion in the furnace. Purging of the bed with air would introduce nitrogen into the furnace and increase furnace $NO_x$ emissions. A continuous purge stream of flue gas is one option. For example, flue gas cooled after heating a bed can be continuously fed back to the bed at about ½ the flow rate of oxygen. This would reduce the concentration of oxygen supplied to the furnace to 67% and may alleviate the safety concern of high purity oxygen contacting with the steel shell of the regenerator. Although the overall thermal efficiency is not compromised, the size of the bed will increase, typically by about 25%. A preferred solution used in the invention, as described in step (3) above, is to recycle cooled flue gas for purging of the regenerator beds only before the heating cycle of each bed begins.

A third problem is the overheating of burner parts with oxygen at a high preheat temperature and production of high $NO_x$ emissions when high temperature oxidant preheating is used. This problem can be solved by using the low NOx combustion process of U.S. Pat. No. 5,076,779, in which fuel and oxygen are injected separately by the burner at high velocities. In accordance with a preferred embodiment of the present invention, both fuel and oxygen are injected through the respective ports at a velocity greater than 50 ft/sec, more preferably greater than 100 ft/sec, and most preferably greater than 200 ft/sec.

A fourth problem is the velocities of the oxygen flow and flue gas flow at the furnace regenerator ports 151 and 152. A high oxygen jet velocity is often preferred for low NOx emissions. On the other hand, low flue gas velocity is preferred to reduce the pressure drop during the exhaust part of the cycle as the flue gas flows through the regenerator port. A solution to this problem is to have a short oxygen injection period and a long exhaust period for each bed and to exhaust heated flue gas through multiple beds to reduce the velocity of flue gas through the regenerator port and the bed. It is preferred to have a flue gas velocity through the furnace regenerator port of less than 200 ft/sec, more preferably less than 100 ft/sec, and most preferably less than 50 ft/sec.

Figure 3:
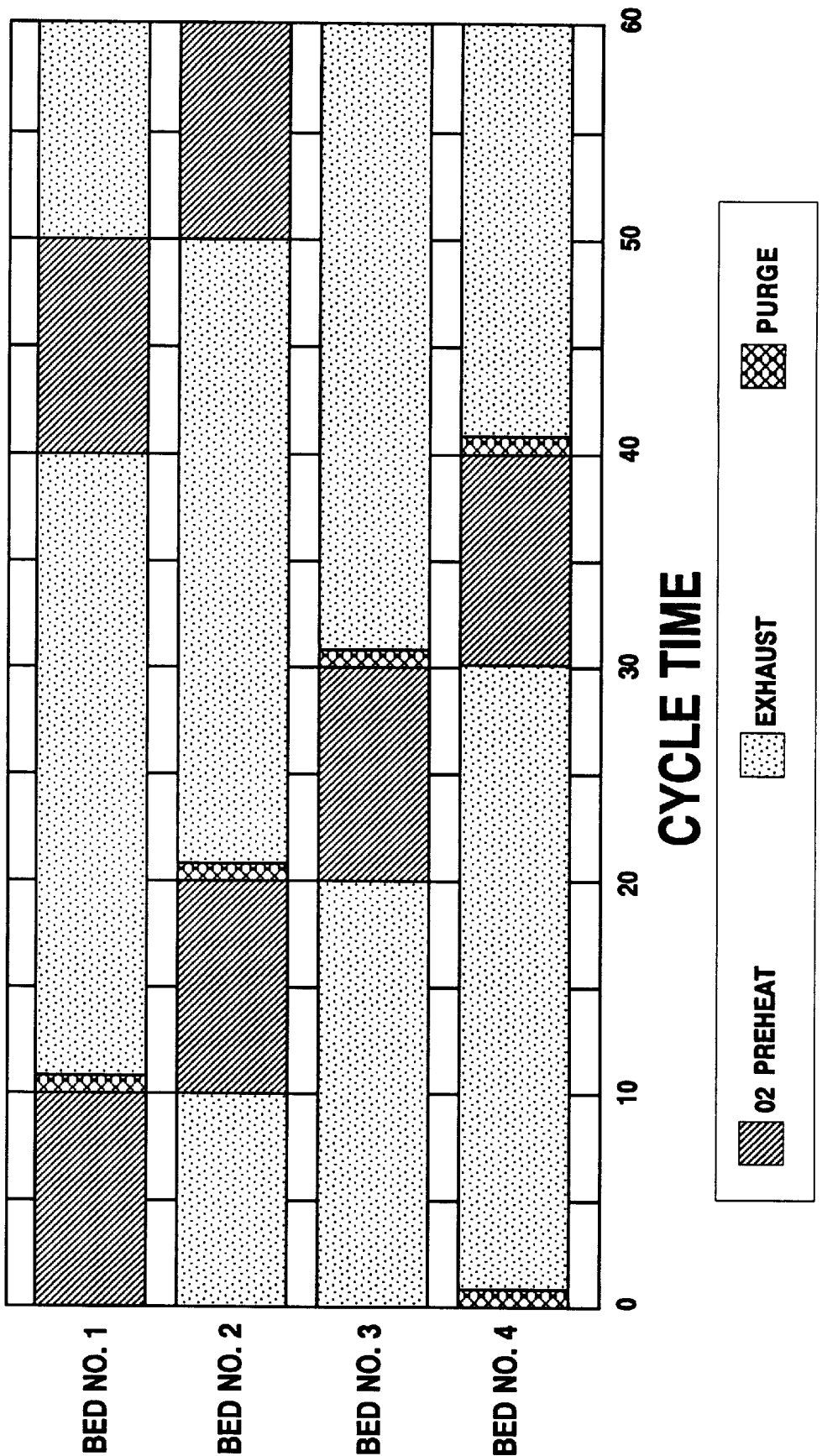
FIG. 3 shows a timing diagram for a four bed regenerator system.

An example of a system using a four bed regenerator cycle is shown in FIG. 3. The four beds illustratively are provided by one regenerator, and in FIG. 3, the four beds are designated on the respective lines of the graph. The system of FIG. 1 can be expanded to have four fuel injection ports or to have one or more common injectors to serve all of the beds. There are four furnace regenerator ports, one for each regenerator bed. Alternatively, multiple ports may be used for each bed. An illustrative cycle time is shown of 40 seconds consisting of 10 seconds of oxygen preheating, 1 second of purge, and 29 seconds of exhausting. As shown, the time of exhaust of flue gas flowing through a bed to preheat it is about three times as long as that of the heating, or firing, of the oxygen flowing through the bed. There is a purge of the residual oxygen in each bed after flowing oxygen through it to be preheated and supplied to the furnace.

As shown in FIG. 3, the cycles of the four beds are staggered so that only one bed is supplying heated oxygen to the furnace while three of the four beds are only being heated by exhausting furnace flue gas. As compared with a four-bed regenerator system with oxygen and flue gas flowing in parallel through two beds each, the velocity of oxygen is doubled and the velocity of flue gas is reduced to two-thirds. If more than one regenerator is used, for example, two regenerators with a total of eight beds, there can be two sets of four beds in parallel with each set operated in the manner shown in FIG. 3, or there can be a staggering of the firing and exhaust times of the eight beds in sequence.

An example of a furnace provided with oxygen preheated with regenerated flue gas in accordance with the invention is described below.

EXAMPLE A

An existing batch type steel reheating furnace is fired with four natural gas and oxy-fuel burners at a firing rate of 20 MMBtu/hr. 20,000 SCFH of natural gas and 41,300 SCFH of commercial grade oxygen are used for combustion without any flue gas heat recovery systems. The average flue gas temperature is 2400° F.

Each of the four oxy-fuel burners is replaced with a low NOx oxy-fuel burner of the type shown in U.S. Pat. No. 5,076,779. The furnace is equipped with two four-bed regenerators (i.e., a total of eight beds) and the corresponding control valves. 46% of the flue gas is continuously exhausted from a separate furnace flue port, such as 17, to a stack without heat recovery and 56% is directed into the regenerators for heating. The regenerator bed material is made of ½ inch diameter alumina balls and heated by the flue gas to a maximum temperature of about 2200° F. at the end of the heating part of a cycle. Each bed is sized to store 4,000 Btu of heat per 40 second regeneration cycle. Each bed has an oxygen preheating period of 19.5 seconds, a purge period of 0.5 seconds, and a flue gas exhaust period of 20 seconds to preheat the bed.

In this example, technically pure oxygen is preheated to an average temperature of about 2000° F. by a regenerator bed. Flue gas temperature downstream of the bed is controlled to less than 300° F. by the bed absorbing the flue gas heat. The average natural gas flow rate is reduced to 18,200 SCFH and the oxygen flow is reduced to 37,600 SCFH as a result of heat recovery. 18,800 SCFH of flue gas is continuously recycled from the downstream of the furnace in the exhaust part of a cycle and fed to the regenerators in oxygen preheat and purge cycles. This example shows fuel and oxygen savings of 9% each.

In the system of FIG. 1, the ambient temperature oxygen is shown being supplied from any standard source. Another approach is to integrate the oxygen preheat regenerator with a pressure swing adsorption air separation system, or a PSA system, to generate oxygen. A "PSA system" is a system which separates gas components from gas mixtures using adsorbents, in one or more beds, comprising the principal steps of adsorption during which a specie or species in a mixture is preferentially adsorbed onto adsorbent, and regeneration or desorption, wherein the preferentially adsorbed specie is removed from the adsorbent by a reduction in the pressure. A two-bed PSA system useful for the practice of this invention comprises two adsorption beds which contain nitrogen adsorbing materials. FIG. 4 shows a PSA bed 551 connected in series to the upstream of the oxygen valve 301 for the regenerator bed 251. During the firing cycle, supply air 56 is fed to the PSA bed 551 through an air valve 571. Nitrogen contained in the air is adsorbed in the bed and oxygen and argon contained in air flow out of the bed 551 through valve 301 to the regenerator bed 251 to be heated and then provided to the furnace through the port 151. Valves 411 and 581 are closed during the firing cycle. During the exhaust cycle for bed 251, the hot furnace flue gas is exhausted through the bed and through valve 411 to the exhaust line 39. The oxygen valve 301 is closed during this cycle. During the exhaust cycle, the nitrogen adsorbed in the PSA bed 551 and residual air are simultaneously exhausted by vacuum pump 59 by opening valve 581. The air valve 571 is closed during this cycle. Regenerator bed 252 would have a similar PSA system and the two PSA systems are operated alternately. By integrating a PSA air separation system with a regenerator the cost of oxygen can be reduced significantly.

It is preferred to use a rapid cycle regenerator to keep the bed size small. However, for recovering heat from flue gases containing particulates or condensable vapors, the gas passages in the regenerator beds must be large enough to prevent plugging problems. For example, the commercial regenerators used for glass melting furnaces typically reverse every 20 to 30 minutes and the average diameter of the gas passages are several inches. The present invention can be equally applied to large regenerators.

Specific features of the invention are shown in one or more of the drawings for convenience only, as each feature may be combined with other features in accordance with the invention. Alternative embodiments will be recognized by those skilled in the art and are intended to be included within the scope of the claims.

I claim:

1. A method of preheating oxygen to be supplied to a furnace comprising:

(A) preheating a first regenerator bed by passing heated flue gas from a furnace through the first regenerator bed and withdrawing cooled flue gas from the first regenerator bed while passing oxygen through a second regenerator bed and from the second regenerator to the furnace and combusting the oxygen with fuel to produce said heated flue gas within the furnace;

(B) stopping the passage of oxygen to the second regenerator bed, passing cooled flue gas through the second regenerator bed and thereafter passing heated flue gas from the furnace through the second regenerator bed for preheating the second regenerator bed; and (C) continuously venting heated flue gas from the furnace through a separate exhaust during the preheating of the first regenerator bed and the second regenerator bed.

2. A method as in claim 1 wherein the velocity of the flue gas from the furnace to a regenerator bed is less than the velocity of preheated oxygen supplied from a regenerator bed to said furnace.

3. A method as in claim 1 wherein the step of preheating a bed is carried out for a longer time than the step of flowing oxygen through the said bed.

4. A method as in claim 1 further comprising the step of providing a plurality of sets of said first and second regenerator beds, and staggering alternation of the heating of said first and second beds of a said set and the flow of oxygen therethrough to substantially continuously supply preheated oxygen to the furnace.

* * * * *